Figure 1:
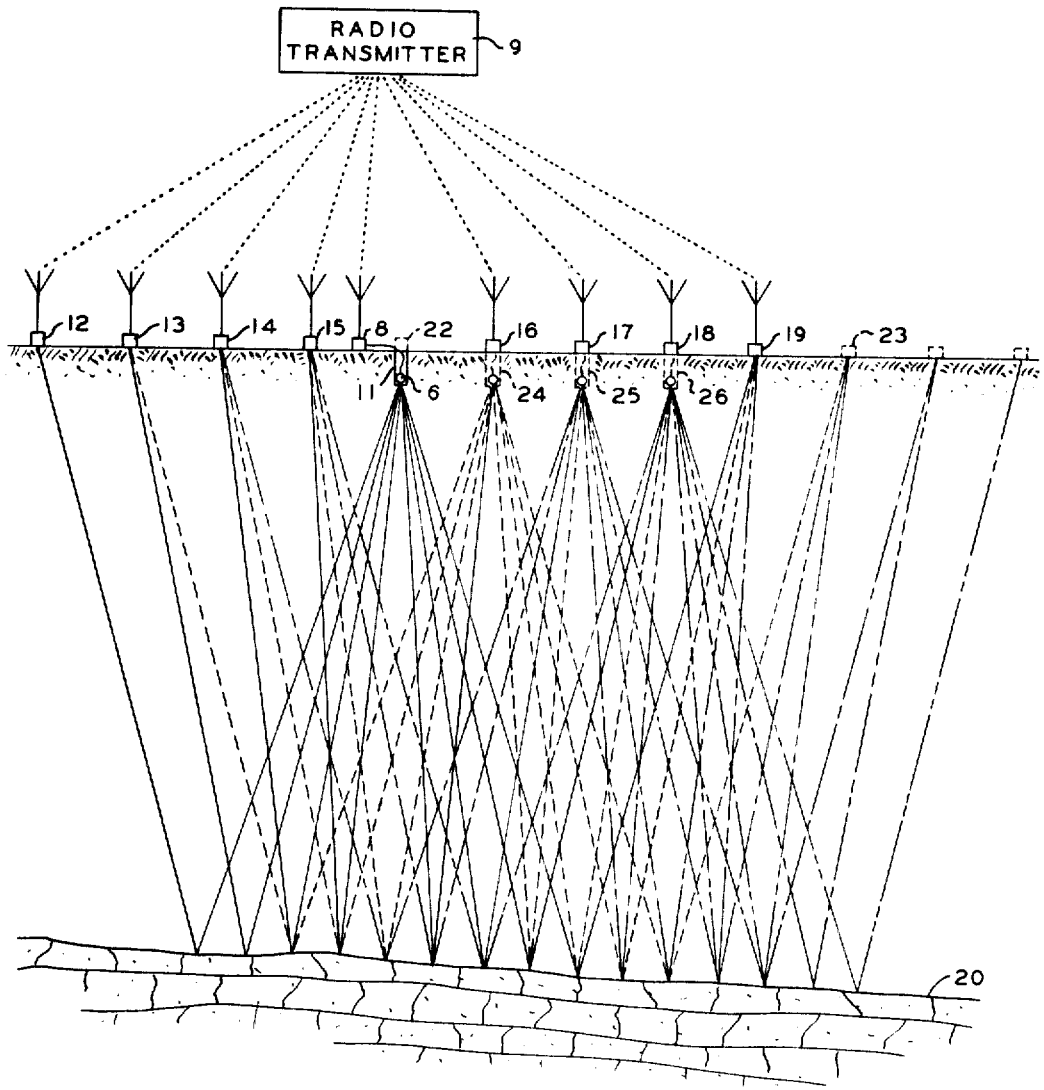

INVENTOR.
O.C. MONTGOMERY
BY Young & Quigg
ATTORNEYS

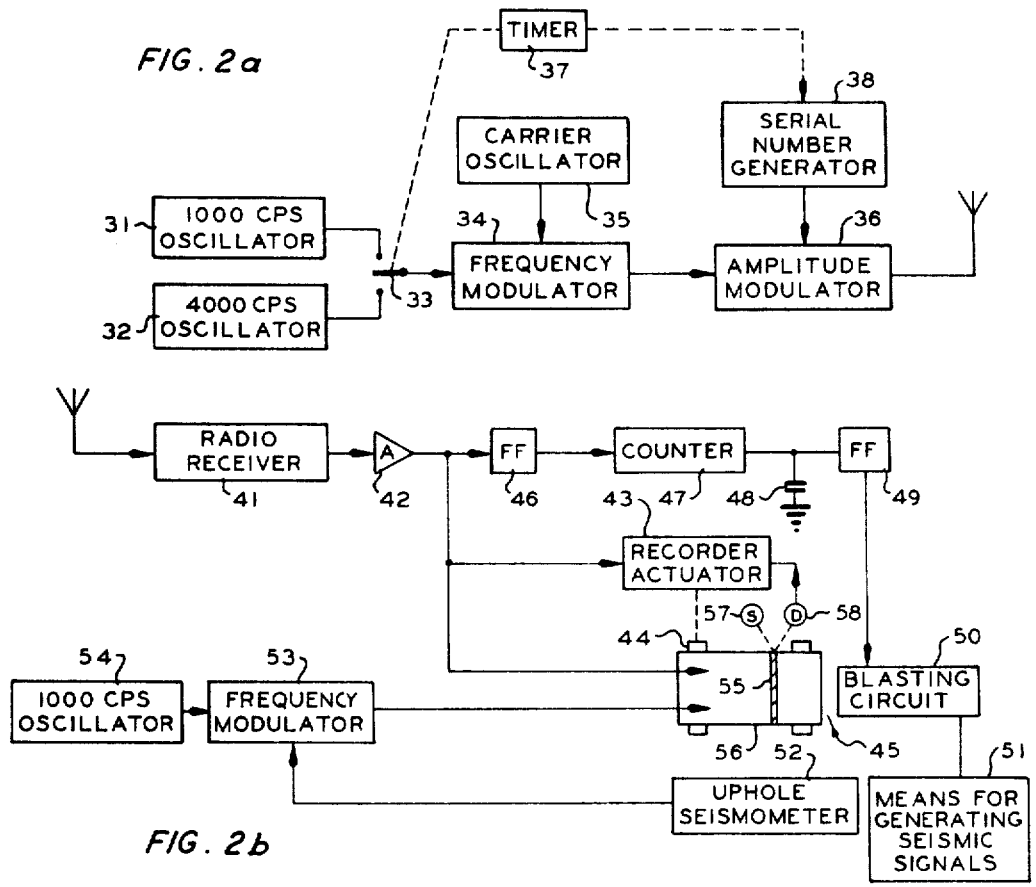
FIG. 2a
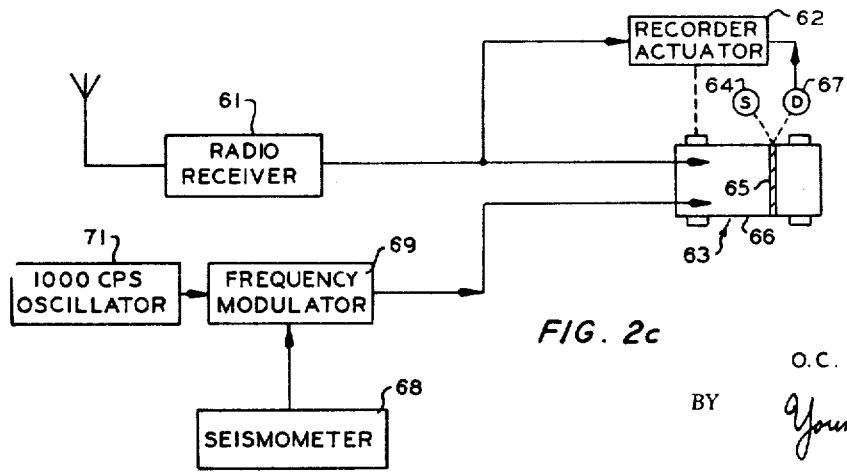
FIG. 2b
FIG. 2c

Nov. 1, 1966    O. C. MONTGOMERY    3,283,295
RADIO SEISMIC SYSTEM
Filed Oct. 18, 1963    4 Sheets-Sheet 3
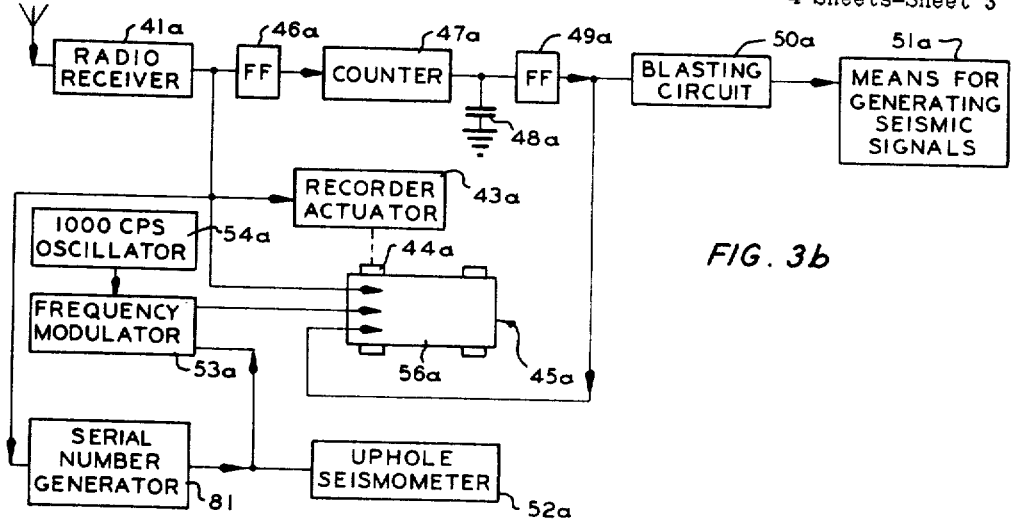
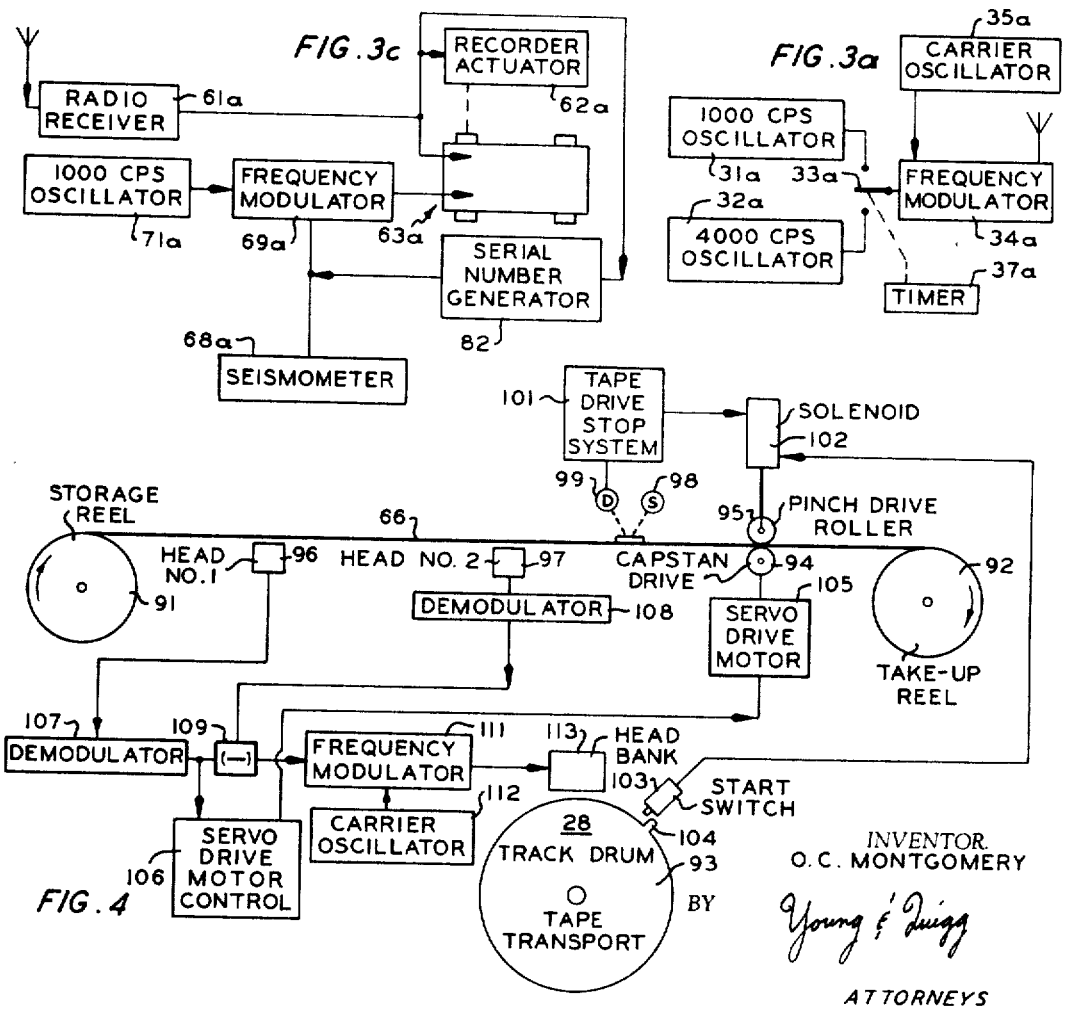
INVENTOR.
O. C. MONTGOMERY
BY Young & Quigg
ATTORNEYS Nov. 1, 1966   O. C. MONTGOMERY   3,283,295
RADIO SEISMIC SYSTEM Filed Oct. 18, 1963   4 Sheets-Sheet 4

INVENTOR.
O.C. MONTGOMERY
BY
Young & Quigg
ATTORNEYS

United States Patent Office 3,283,295
Patented Nov. 1, 1966

3,283,295
RADIO SEISMIC SYSTEM
Orin C. Montgomery, Bartlesville, Okla., assignor to Phillips Petroleum Company, a corporation of Delaware
Filed Oct. 18, 1963, Ser. No. 317,211
12 Claims. (Cl. 340—15.5)

This invention relates to a radio seismic system. In a more specific aspect the invention relates to a single channel radio system for controlling the generation of the seismic signal at the shot point and the recording of the reflected seismic signal at various geophone locations. In a further aspect of the invention there is provided a radio seismic system for preventing the generation of the seismic signal due to electrical noise. In another aspect the invention relates to method and apparatus for providing a common timing signal to a plurality of seismic recorders to permit the processing of the seismic records. In a further aspect the invention relates to method and means for eliminating noise in a seismic record due to varitions in the speed of the recording medium. In yet another aspect the invention relates to method and apparatus for transferring a plurality of signals from a plurality of first recording mediums to a second recording medium with uniform time spacing of the plurality of signals on the second recording medium regardless of variations in the speed at which the plurality of signals were recorded on the respective first recording medium.

Heretofore, in the art of geophysical prospecting, subterranean geological formations have been mapped by firing an explosive charge at a shot point near the surface of the earth and determining, at one or more points remote from the shot point, the time required for the explosion waves to be elastically propagated from the shot point to the points at which the waves are measured. Ordinarily, the earth waves are picked up by geophones and, in previous systems, the geophone stations and the recording vehicle were customarily connected by a long cable. At the recording vehicle, the signals from the geophones were fed to a set of electronic amplifiers and thence to a recorder which furnished an indication of the seismic waves at each geophone station.

It has been recognized that greatly improved results might be obtained if the connecting cables between the geophones and the recording vehicle could be eliminated, as the use of such cables substantially limits the use of the prior art system to relatively accessible and smooth areas, and the cable also provides a definite limit to the distance between the recording vehicle and the various geophone stations, as well as limiting the arrangement of geophones about the point of interest. This is particularly true for seismic prospecting over bodies of water.

It has been previously proposed to replace this cable structure by radio linkages between the shot point, the geophone stations, and the recording vehicles. If this could be accomplished, the relative position of the geophone stations and the recording vehicle would not be limited by the length of the cable but, rather, the geophones could be located at any point within a distance of several miles from the recording vehicle which would substantially increase the flexibility and usefulness of the prospecting equipment.

The radio geophone systems previously proposed have generally failed to provide a workable system on a practical and commercial scale. To a large extent, this has resulted from the difficulties inherent in separating the individual radio waves emanating from each geophone station and separately amplifying them without serious cross talk or distortion. This latter difficulty, particularly phase distortion, results in a shift of the received waves along the time axis, which is particularly undesirable in a geophysical prospecting system where the accurate measurement of time intervals is of prime importance. Similarly, any appreciable cross talk between the respective receiving channels obviously results in substantial inaccuracies in the recorded signals. This difficulty is accentuated by the fact that the transmitters at the respective geophone stations must occupy closely adjacent frequencies to meet commercial and governmental requirements. Other systems which utilize a single channel require both a radio receiver and a radio transmitter as well as elaborate delay means at each seismometer station to sequentially transmit the seismic signals from the seismic stations to the control center after each shot.

In accordance with the invention there is provided an improved single channel radio seismic system which eliminates the requirement of a radio transmitter and delay means at each seismometer station and a radio receiver at the control center, and which can be utilized to record the seismic signals from a plurality of shot points before the recorded seismic signals are transferred from the seismometer recorder to the control center. A common timing signal is transmitted from the control center to the seismic signal generating equipment and to each seismometer station. This timing signal can also be utilized to actuate the recorders at the shot point and each seismometer station. A change in frequency in the timing signal can be utilized to initiate the generation of the seismic signal and as a common time reference point on the recorders. The timing signal can be recorded on a separate channel of each recorder and upon subsequent reproduction can be utilized to drive the reproducer at the same speed as the record to thereby provide uniform time spacing of the reproduced signals. Each seismic signal can be recorded by utilizing the seismometer output to frequency modulate either the timing signal or another standard frequency and recording the frequency modulated signal. Upon the reproduction of the frequency modulated signal, the timing signal can be subtracted therefrom to substantially reduce or eliminate noise due to variations in the speed of the recording and/or reproducing.

Accordingly, it is an object of the invention to provide an improved radio seismic system. It is another object of the invention to provide means and method for correlationg a plurality of seismic signals with respect to time. Another object of the invention is to provide method and apparatus for reproducing a plurality of seismic signals with uniform time spacing. Another object of the invention is to provide improved method and apparatus for controlling a plurality of recorders by radio signals. A still further object of the invention is to provide a safety feature in the system for actuating the seismic signal generation to avoid such actuation by radio noise. Yet another object of the invention is to provide method and apparatus for substantially reducing or eliminating noise due to variations in the speed of recording and/or reproducing.

Other objects, aspects, and advantages of the invention will become apparent to those skilled in the art from a study of the disclosure, the drawing and the appended claims to the invention.

Figure 5:
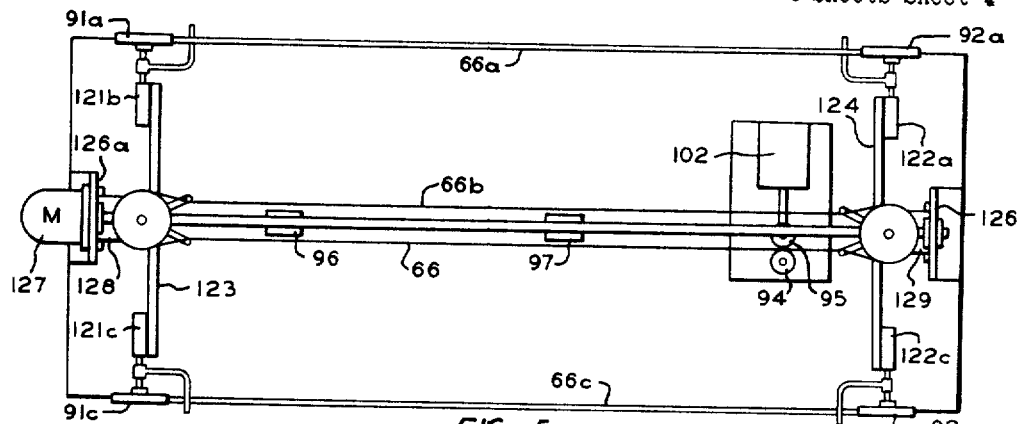
Figure 6:
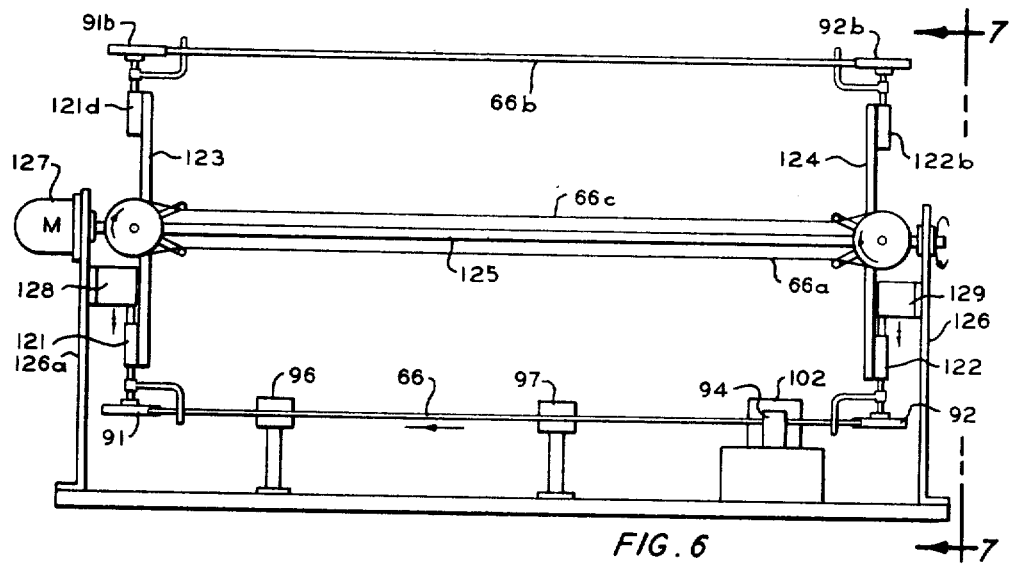
Figure 7:
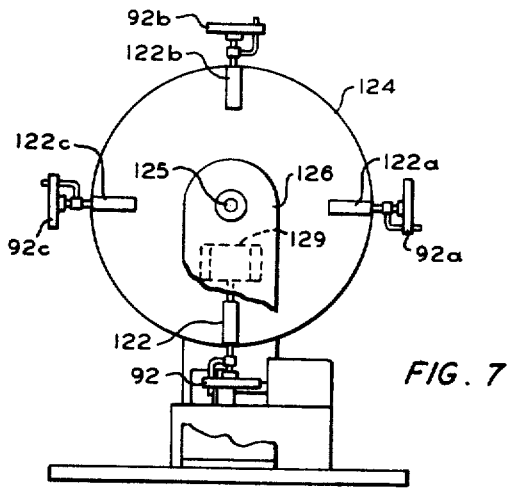

In the drawings FIGURE 1 is a schematic representation of a seismic exploration procedure utilizing the invention; FIGURES 2a, 2b, and 2c are schematic representations of a control transmitter, shot point equipment, and seismometer station equipment, respectively, in accordance with a presently preferred embodiment of the invention; FIGURES 3a, 3b, and 3c are schematic representations of a control transmitter, shot point equipment, and seismometer station equipment, respectively, in accordance with a second embodiment of the invention;

FIGURE 4 is a schematic representation of a reproducing system in accordance with the invention; FIGURE 5 is a partial plan view of a reproducing mechanism which can be utilized in the system of FIGURE 4; FIGURE 6 is a partial elevation view of the mechanism of FIGURE 5; and FIGURE 7 is a partial side elevation view taken along the line 7—7 in FIGURE 6.

Referring now to the drawings in general and to FIGURE 1 in particular, an explosive charge 6 is detonated in a shot hole 11 adjacent the surface of the earth by means of shot hole equipment 8 which is actuated by a radio signal from radio transmitter 9, the latter being located in a control center. The resulting vibrations are received at a plurality of seismometer stations 12, 13, 14, 15, 16, 17, 18 and 19 which are positioned at the surface of the earth on both sides of shot hole 11. The distances between adjacent seismometers are equal and equal to the distance the closest seismometers are positioned to the shot hole. As can be seen from the drawing, vibrations travel downwardly from shot hole 11 and are reflected back to the surface of the earth from a subterranean reflecting bed 20. The vibrations received by a given seismometer are recorded on one channel of a recorder having at least two channels and which is located with the respective seismometer. A timing signal is transmitted from transmitter 9 to shot hole equipment 8 and to each seismometer station where it is recorded on a second channel of each recorder. Thereafter, seismometers 12 and 16 are removed and additional seismometers 22 and 23 are positioned, as shown. An explosive charge is then detonated in a shot hole 24 which is positioned in the location originally occupied by seismometer 16. The resulting vibrations received by the eight seismometers then employed are separately recorded by the respective seismometer recorder along with the common timing signal. Thereafter, explosive charges are detonated in sequence in shot holes 25 and 26. Four seismometers are positioned on each side of each of the shot holes to record the resulting vibrations.

From an inspection of the drawing it can be seen that a plurality of vibrations are reflected from common points on reflecting bed 20. It is frequently desirable to combine the recorded vibrations in such a manner that vibrations reflected from common reflecting beds are superimposed in the resulting composite record. While a total of eight seismometers has been illustrated in conjunction with each shot hole for simplicity, it should be evident that additional seismometers can be employed to obtain more reflected vibrations from each shot hole. In normal operations, a substantially larger number of seismometers is employed.

Referring now to FIGURE 2a, there is illustrated a presently preferred embodiment of radio transmitter 9. The outputs of oscillators 31 and 32 are connected to first and second terminals, respectively, of switch 33. Oscillators 31 and 32 can have any desired frequency outputs so long as they are different. While the frequency of oscillator 32 can be higher or lower than that of oscillator 31, the presently preferred embodiment is the former. In one particular embodiment oscillator 31 has a frequency output of 1000 c.p.s. while oscillator 32 has a frequency of 4000 c.p.s. The contactor of switch 33 is connected to the signal input of frequency modulator 34. The output of carrier frequency oscillator 35, which can be any suitable frequency, for example 1700 k.c.p.s., is applied to the carrier input of modulator 34. The output of frequency modulator 34 is applied to the carrier input of amplitude modulator 36. The output of modulator 36 is applied to a radio antenna. When the transmitting equipment is first actuated, switch 33 connects the output of oscillator 31 to the signal input of frequency modulator 34. The resulting frequency modulated signal is transmitted to the shot point equipment 8 and the various seismometer stations to actuate the recorders. After a suitable interval timer 37 actuates serial number generator 38 which produces an amplitude signal or signals representative of the identification of the shot. The output of generator 38 is applied to the signal input of amplitude modulator 36. The resulting amplitude-frequency modulated signal is transmitted to the various recorders where it provides the desired identification data. Subsequent to the transmission of the serial number identification data, timer 37 actuates switch 33 to disconnect oscillator 31 and to connect oscillator 32 to the input of frequency modulator 34 for a short time interval, for example on the order of 40 milliseconds, and then to disconnect oscillator 32 and to reconnect oscillator 31 to the input of modulator 34. This change in frequency actuates the blasting circuit in a manner subsequently described.

Referring now to FIGURE 2b, the radio receiver 41 is turned on when the seismometer station is installed and is to be used. Upon the actuation of transmitter 9, to transmit the 1000 c.p.s. frequency modulated signal, radio receiver 41 produces a 1000 c.p.s. output signal which is amplified by amplifier 42 and applied to the start input of recorder actuator 43. Actuator 43 in turn actuates take up reel 44 of the recorder 45. The output of amplifier 42 is also applied to a recording mechanism for one channel of recorder 45. The output of amplifier 42 is also applied to an input of a suitable pulse shaping network, for example a flip flop circuit, 46 to produce a substantially square wave output. The output of flip flop circuit 46 is applied to an input of suitable counting means, for example a binary counter, 47. The output of counter 47 is applied across a capacitor 48 to produce a voltage thereacross representative of the instantaneous average of the number of pulses counted. Capacitor 48 is connected across the input of flip flop circuit 49 which requires a predetermined value of input voltage to change state. The voltage across capacitor 48 during the transmission of the 1000 c.p.s. signal is less than the predetermined value of input voltage necessary to actuate flip flop circuit 49 whereas the voltage across capacitor 48 during the transmission of the 4000 c.p.s. signal is greater than such predetermined value and causes flip flop circuit to pass an output signal to blasting circuit 50 to actuate seismic signal generator means 51. Upon the return of the transmission from the 4000 c.p.s. signal to the 1000 c.p.s. signal, flip flop circuit 49 returns to its original state, thereby terminating the firing signal applied to blasting circuit 50. While blasting circuit 50 can be any suitable means known in the art, the presently preferred system is that described in Patent 2,707,524, issued on May 3, 1955.

The vibrations from the generation of the seismic signals are received by uphole seismometer 52, the output of which is applied to the signal input of frequency modulator 53. The output of a standard frequency oscillator 54, for example 1000 c.p.s., is applied to the carrier input of modulator 53. The output of modulator 53 is applied to a recording mechanism for one channel of recorder 45. Markers 55, such as strips of white tape, are positioned on recording tape 56 at regularly spaced intervals, each interval being sufficient to permit the recording of the identification data and the detected seismic signals for a shot. A suitable source of light 57, if needed, can be positioned to reflect light from markers 55 to a light detector 58. The output of detector 58 is applied to the stop input of recorder actuator 43 to cause recorder 45 to stop.

Referring now to FIGURE 2c, there is shown an example of the equipment located at each seismometer station. The output of radio receiver 61 is applied to the start input of recorder actuator 62 to start recorder 63 and to a recording mechanism for one channel of recorder 63. Light from source 64 reflected from markers 65 on recording tape 66 to light detector 67 causes recorder actuator 62 to stop movement of tape 66. The reflected seismic signals are detected by seismometer 68, the output of which is applied to the signal input of frequency modulator 69. The output of a standard oscillator 71, for example 1000 c.p.s., is applied to the carrier input of modulator 69. The output of modulator 69 is applied to a recording mechanism for one channel of recorder 63.

Referring now to FIGURES 3a, 3b, and 3c, there are illustrated modifications of FIGURES 2a, 2b, and 2c, respectively, and common elements are designated with the corresponding numbers for FIGURES 2a, 2b, and 2c in combination with an "a." FIGURE 3a is similar to FIGURE 2a except for the omission of serial number generator 38 and amplitude modulator 36. The function of the former elements is performed by serial number generators 81 and 82 in FIGURES 3b and 3c, respectively. The appearance of a signal in the output of radio receiver 41a actuates generator 81 which applies an amplitude signal representative of the identification data to the signal input of frequency modulator 53a. The presence or absence of an output signal from receiver 41a is utilized by recorder actuator 43a to start or stop recorder 45a. The output of flip flop circuit 49a can be applied to a recording mechanism for one channel of recorder 45a to provide a check on the detonation of the charge at the proper time as indicated by flip flop circuit 49a. The appearance of an output signal from receiver 61a actuates generator 82 which applies an amplitude signal representative of the identification data to the signal input of modulator 69a. The presence or absence of an output signal from receiver 61a is utilized by recorder actuator 62a to start or stop recorder 63a.

Referring now to FIGURE 4, the tape 66 from one of recorders 63 is placed on storage reel 91 and take up reel 92 for transfer to tape drum 93, which has a suitable number of channels, for example twenty-eight. Tape 66 is positioned between capstan drive 94 and pinch drive roller 95 and adjacent reproducing heads 96 and 97. Head 96 produces the recorded timing signal and is positioned with respect to tape 66 to be just before the location of the recording of the 4000 c.p.s. firing signal. Head 97 is positioned to reproduce the frequency modulated seismic signals. The tape 66 is positioned with respect to reproducing heads 96 and 97 by means of markers 65 which are detected by the reflection of light from source 98 to detector 99. The output of detector 99 is applied to the input of a tap drive stop system 101, the output of which is applied to drive solenoid 102 to withdraw drive roller 95 from contact with tape 66. Tape transport 93 is brought up to a predetermined recording speed, and start switch 103 is actuated by a cam 104 positioned on tape transport 93 to initiate the recording at a predetermined position on the tape drum. The actuation of start switch 103 causes drive solenoid 102 to position drive roller 95 against tape 66 opposite capstan drive 94, thereby causing movement of tape 66. Capstan drive 94 is actuated by servo drive motor 105 which in turn is controlled by servo drive motor control 106. The output of reproducing head 96 can be applied to an input of demodulator 107 to produce an amplitude signal representative of noise in the recorded timing signal due to variations in the speed of the recorder. The output of demodulator 107 is applied to an input of motor control 106. For a zero input to motor control 106, motor 105 rotates capstan drive 94 at a predetermined speed. When reproducing head 96 applies the recorded timing signal to demodulator 107, the speed at which motor 105 rotates capstan drive 94 is varied responsive to the variations of the recorded timing signal from the original timing signal or other standard. Thus when recorder 63 increases its speed, the recording of the timing signal is spread or expanded while the recording of the timing signal is compressed when recorder 63 decreases its speed. The compression or expansion of the recorded timing signal, as reproduced by head 96, is utilized by motor control 106 to vary the speed of capstan drive 94 and thus of tape 66 to maintain the instantaneous speed of tape 66 during reproduction substantially identical to the instantaneous speed of tape 66 during recording. Thus an event which occurred for one-tenth of a second and was recorded on tape 66 when the speed thereof was 7.1 i.p.s. would occupy 0.71 inch of the tape. If tape 66 were played back at 7.5 i.p.s. for transfer to tape drum 93, the reproduced event would occur for 0.0947 second, rendering the comparison thereof with other seismic signals more difficult. The system of FIGURE 4 permits the reproduction of a recorded event for the same time spacing or interval as that of the original event regardless of variations in the speed of the recorder or a difference in the speed of the recorder from a standard speed.

The output of reproducing head 97 can be applied to an input of demodulator 108 to produce an amplitude signal representative of the recorded seismic signal and any noise due to variations in the speed of the recorder. The outputs of demodulators 107 and 108 can be applied to first and second inputs, respectively, of subtractor 109 to produce a signal representative of the recorded seismic signal substantially free of noise due to variations in recorder speed. The output of subtractor 109 can be applied to the signal input of frequency modulator 111. The output of a carrier oscillator 112 is applied to the carrier input of modulator 111. The output of modulator 111 is applied to an input of head bank 113 for recording on drum 93.

Referring now to FIGURES 5, 6 and 7 there is illustrated, with several elements omitted for sake of clarity, an apparatus which is suitable for sequentially reproducing from a plurality of records 66, 66a, 66b, and 66c, the recorded seismic signals corresponding to each of a plurality of shots. Elements common to FIGURE 4 are designated by the same numbers and additional tapes and reels are designated by the corresponding numbers with the addition of "a," "b" or "c." A plurality of storage reels 91, 91a, 91b and 91c are movably positioned by holders 121, 121a, 121b and 121c are held in a first position by means of springs, not shown. A plurality of take up reels 92, 92a, 92b and 92c are movably positioned by holders 122, 122a, 122b and 122c. Holders 121, 121a, 121b and 121c are radially mounted on disc 123 while holders 122, 122a, 122b and 122c are radially mounted on disc 124. Discs 123 and 124 are mounted on shaft 125 and are rotated thereby. Shaft 124 is supported by end supports 125 and 126 and is rotated by means of turret rotating unit 127 mounted on support 125. Solenoids 128 and 129 are mounted on supports 125 and 126 above the holders 121 and 122 and are adapted upon actuation thereof to move reels 91 and 92 from their first or retracted position downwardly to a second or reproducing position on the level of reproducing heads 96 and 97, roller 95 and drive 94. Upon the deactuation of the solenoids 128 and 129 the springs (not shown) in holders 121 and 122 return reels 91 and 92 to their original position. Rotating unit 127 then rotates a new tape into reproducing position.

While the frequency modulated system for actuating blasting circuit 50 has been illustrated in FIGURES 2a and 2b and 3a and 3b in a radio seismic system it is apparent that this FM actuating system also possesses considerable advantages when utilized in a conventional seismic system employing telephone lines instead of radio transmitters and receivers.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Suffice to say, the drawing is for illustrative purposes, as is the description thereof.

Reasonable variation and modification are possible within the scope of the foregoing disclosure, the drawing and the appended claims.

I claim:

1. Seismic exploration system comprising, in combination:

(1) a control unit comprising a first oscillator means for producing a first output signal having a first frequency, a second oscillator means for producing a second output signal having a second frequency higher than said first frequency, a third oscillator means for producing a third output signal having a frequency in the radio range, a first frequency modulator having a signal input and a carrier input, switching means for selectively applying one of said first and second output signals to said signal input of said first frequency modulator, means for applying said third output signal to said carrier input of said first frequency modulator, an amplitude modulator having a signal input and a carrier input, means for applying the output of said first frequency modulator to said carrier input of said amplitude modulator, means for generating an amplitude signal representative of desired identification data, means for applying said amplitude signal to said signal input of said amplitude modulator, timing means for actuating said switching means and said means for generating at preselected times, and a radio antenna means connected to the output of said amplitude modulator;

(2) shot point equipment comprising a first radio receiver, a first multiple channel tape recording means, means responsive to the output of said first radio receiver for actuating said first tape recording means, means for applying said output of said first radio receiver to one channel of said first tape recording means, a second frequency modulator having a signal input and a carrier input, a first seismometer, means for applying the output of said first seismometer to said signal input of said second frequency modulator, a fourth oscillator means, means for applying the output of said fourth oscillator means to said carrier input of said second frequency modulator, means for applying the output of said second frequency modulator to a second channel of said first tape recording means, means responsive to markers on the tape of said first tape recording means to deactuate said first tape recording means, a first flip flop circuit, means for applying the output of said first radio receiver to an input of said first flip flop circuit, pulse counting means, means for applying an output of said first flip flop circuit to an input of said pulse counting means, a second flip flop circuit, a capacitor connected across the output of said pulse counting means and across an input of said second flip flop circuit, means for generating seismic signals, and means for energizing said means for generating seismic signals responsive to an output of said second flip flop circuit;

(3) a plurality of seismometer station equipments, each of said seismometer station equipments comprising a second radio receiver, a second multiple channel tape recording means, means responsive to the output of said second radio receiver for actuating said second tape recording means, means for applying the output of said second radio receiver to one channel of said second tape recording means, means responsive to markers on the tape of said second tape recording means for deactuating said second tape recording means, a second seismometer, a third frequency modulator having a signal input and a carrier input, means for applying the output of said second seismometer to said signal input of said third frequency modulator, fifth oscillator means, means for applying the output of said fifth oscillator means to said carrier input of said third frequency modulator, and means for applying the output of said third frequency modulator to a second channel of said second tape recording means; and (4) reproducing means comprising first and second discs supported on a common shaft in a spaced apart relationship, a plurality of tape reel holders radially positioned on each of said discs, first solenoid means positioned adjacent said first disc and adapted to cooperate with one of said tape reel holders positioned on said first disc to move the tape reel supported thereon from a retracted position to a reproducing position, second solenoid means positioned adjacent said second disc and adapted to cooperate with the tape reel holder positioned on said second disc corresponding to said one of said tape reel holders positioned on said first disc to move the tape reel supported thereon from a retracted position to a reproducing position, a first reproducing head positioned adjacent said reproducing position to produce a fourth output signal representative of the reproduction of a timing signal recorded on a first channel of the recording tape, a second reproducing head positioned adjacent said reproducing position to produce a fifth signal representative of the reproduction of a frequency modulated seismic signal recorded on a second channel of the recording tape, a drive means and a drive roller positioned in cooperative relationship with each other and adapted to move a recording tape positioned in said reproducing position, a first demodulator means, means for applying the output of said first reproducing head to an input of said first demodulator means to produce a control signal representative of the variations of said fourth output signal from a standard, means responsive to said control signal for varying the speed of rotation of said drive means, a second demodulator means, means for applying the output of said second reproducing head to an input of said second demodulator means, subtracting means, means for applying the output signals of said first and second demodulator means to first and second inputs, respectively, of said subtracting means, a fourth frequency modulator having a signal input and a carrier input, means for applying the output of said subtracting means to said signal input of said fourth frequency modulator, a sixth oscillator means, means for applying the output of said sixth oscillator means to said carrier input of said fourth frequency modulator, a multiple track recording means, means for applying the output of said fourth frequency modulator to one track of said multiple track recording means, means responsive to the movement of said multiple track recording means for actuating said drive roller into a tape engaging position, and means responsive to markers on a recording tape in said reproducing position to retract said drive roller from the tape engaging position.

2. Seismic exploration apparatus comprising, in combination:

(1) a control unit comprising a first oscillator means for producing a first output signal having a first frequency, a second oscillator means for producing a second output signal having a second frequency higher than said first frequency, a third oscillator means for producing a third output signal having a frequency in the radio range, a first frequency modulator having a signal input and a carrier input, switching means for selectively applying one of said first and second output signals to said signal input of said first frequency modulator, means for applying said third output signal to said carrier input of said first frequency modulator, timing means for actuating said switching means at preselected times, and a radio antenna means connected to the output of said first frequency modulator; and (2) shot point equipment comprising a radio receiver, a first flip flop circuit, means for applying the output of said radio receiver to an input of said first flip flop circuit, pulse counting means, means for applying an output of said first flip flop circuit to an input of said pulse counting means, a second flip flop circuit, a capacitor connected across the output of said pulse counting means and across an input of said second flip flop circuit to produce a voltage thereacross representative of the instantaneous average of the number of pulses counted by said pulse counting means, said second flip flop circuit being caused to change state when the input voltage thereto exceeds a predetermined value, means for generating seismic signals, and means for energizing said means for generating seismic signals responsive to an output of said second flip flop circuit.

3. Seismic exploration apparatus comprising, in combination:

(1) a control unit comprising a first oscillator means for producing a first output signal having a first frequency, a second oscillator means for producing a second output signal having a second frequency, a third oscillator means for producing a third output signal having a frequency in the radio range, a first frequency modulator having a signal input and a carrier input, switching means for selectively applying one of said first and second output signals to said signal input of said first frequency modulator, means for applying said third output signal to said carrier input of said first frequency modulator, timing means for actuating said switching means at preselected times, and a radio antenna means connected to the output of said first frequency modulator;

(2) shot point equipment comprising a first radio receiver, a first flip flop circuit, means for applying the output of said first radio receiver to an input of said first flip flop circuit, pulse counting means, means for applying an output of said first flip flop circuit to an input of said pulse counting means, a second flip flop circuit, a capacitor connected across the output of said pulse counting means and across an input of said second flip flop circuit, means for generating seismic signals, and means for energizing said means for generating seismic signals responsive to an output of said second flip flop circuit; and (3) a plurality of seismometer station equipments, each of said seismometer station equipments comprising a second radio receiver, a multiple channel tape recording means, means responsive to the output of said second radio receiver for actuating said tape recording means, means for applying the output of said second radio receiver to one channel of said tape recording means, a second frequency modulator having a signal input and a carrier input, a seismometer, means for applying the output of said seismometer to said signal input of said second frequency modulator, fourth oscillator means, means for applying the output of said fourth oscillator means to said carrier input of said second frequency modulator, and means for applying the output of said second frequency modulator to a second channel of said tape recording means.

4. Seismic exploration system comprising, in combination:

(1) a control unit comprising a first oscillator means for producing a first output signal having a first frequency, a second oscillator means for producing a second output signal having a second frequency, a third oscillator means for producing a third output signal having a frequency in the radio range, a first frequency modulator having a signal input and a carrier input, switching means for relatively applying one of said first and second output signals to said signal input of said first frequency modulator, means for applying said third output signal to said carrier input of said first frequency modulator, timing means for actuating said switching means at preselected times, and a radio antenna means connected to the output of said first frequency modulator;

(2) shot point equipment comprising a first radio receiver, means for generating seismic signals, and means responsive to the output of said first radio receiver for actuating said means for generating only when the output of said first radio receiver is representative of the reception of a signal having said second frequency; and (3) seismometer station equipment comprising a second radio receiver, a multiple channel recording means, means for applying the output of said second radio receiver to one channel of said recording means, a seismometer, means for applying a signal representative of the output of said seismometer to a second channel of said recording means.

5. Apparatus in accordance with claim 4 further comprising means for applying to said recording means a signal representative of desired identification data.

6. Apparatus comprising first and second discs supported on a common shaft in a spaced apart relationship, a plurality of tape reel holders radially positioned on each of said discs, first solenoid means positioned adjacent said first disc and adapted to cooperate with one of said said tape reel holders positioned on said first disc to move the tape reel supported thereon from a retracted position to a reproducing position, second solenoid means positioned adjacent said second disc and adapted to cooperate with the tape reel holder positioned on said second disc corresponding to said one of said tape reel holders positioned on said first disc to move the tape reel supported thereon from a retracted position to a reproducing position, a first reproducing head positioned adjacent said reproducing position to produce a first output signal representative of the reproduction of a timing signal recorded on a first channel of the recording tape, a second reproducing head positioned adjacent said reproducing position to produce a second signal representative of the reproduction of a frequency modulated information signal recorded on a second channel of the recording tape, a drive means and a drive roller positioned in cooperative relationship with each other and adapted to move said recording tape, a first demodulator means, means for applying the output of said first reproducing head to an input of said first demodulator means to produce a control signal representative of the variations of said first output signal from a standard, means responsive to said control signal for varying the speed of rotation of said drive means, a second demodulator means, means for applying the output of said second reproducing head to an input of said second demodulator means, subtracting means, means for applying the output signals of said first and second demodulator means to first and second inputs, respectively, of said subtracting means, a multiple track recording means, means for applying a signal representative of the output of said subtracting means to one track of said multiple track recording means, means responsive to the movement of said multiple track recording means for actuating said drive roller into a tape engaging position, and means responsive to markers on said recording tape in said reproducing position to retract said drive roller from the tape engaging position.

7. Apparatus comprising first and second discs supported on a common shaft in a spaced apart relationship, a plurality of tape reel holders radially positioned on each of said discs, first solenoid means positioned adjacent said first disc and adapted to cooperate with one of said tape reel holders positioned on said first disc to move the tape eel supported thereon from a retracted position to a reproducing position, second solenoid means positioned adjacent said second disc and adapted to cooperate with the aep reel holder positioned on said second disc corresponding to said one of said tape reel holders positioned on said irst disc to move the tape reel supported thereon from a retracted position to a reproducing position, a first reproducing head positioned adjacent said reproducing position to produce a first output signal representative of the reproduction of a timing signal recorded on a first channel of the recording tape, a second reproducing head positioned adjacent said reproducing position to produce a second signal representative of the reproduction of an information signal recorded on a second channel of the recording tape, a drive means and a drive roller positioned in cooperative relationship with each other and adapted to move a recording tape positioned in said reproducing position, a first demodulator means, means for applying the output of said first reproducing head to an input of said first demodulator means to produce a control signal representative of the variations of said first output signal from a standard, and means responsive to said control signal for varying the speed of rotation of said drive means.

8. Seismic exploration system comprising, in combination:
 (1) a control unit comprising a first oscillator means for producing a first output signal having a first frequency, a second oscillator means for producing a second output signal having a second frequency, a third oscillator means for producing a third output signal having a frequency in the radio range, a first frequency modulator having a signal input and a carrier input, switching means for relatively applying one of said first and second output signals to said signal input of said first frequency modulator, means for applying said third output signal to said carrier input of said first frequency modulator, timing means for actuating said switching means at preselected times, and a radio antenna means connected to the output of said first frequency modulator;
 (2) shot point equipment comprising a first radio receiver, means for generating seismic signals, and means responsive to the output of said first radio receiver for actuating said means for generating only when the output of said first radio receiver is representative of the reception of a signal having said second frequency;
 (3) seismometer station equipment comprising a second radio receiver, a multiple channel recording means, means for applying the output of said second radio receiver to one channel of said recording means, a seismometer, means for applying a signal representative of the output of said seismometer to a second channel of said recording means; and
 (4) reproducing means comprising a first reproducing head positioned adjacent said recording means to produce a first output signal representative of the reproduction of the timing signal recorded on said first channel of said recording means, a second reproducing head positioned adjacent said recording means to produce a second signal representative of the reproduction of said signal representative of the output of said seismometer, means for driving said recording means, a first demodulator means, means for applying the output of said first reproducing head to an input of said first demodulator means to produce a control signal representative of the variations of said first signal from a standard, and means responsive to said control signal for regulating said means for driving to vary the speed movement of said recording means.

9. A method of seismic exploration comprising, in combination, the steps of establishing a first signal having a first frequency, establishing a second signal having a second frequency substantially higher than said first frequency, establishing a third signal having a frequency in the radio range, frequency modulating said third signal selectively by one of said first and second signals, transmitting the thus modulated third signal from a first point, receiving at a second point the thus transmitted signal and establishing a fourth signal representative thereof, generating seismic signals at said second point when the frequency of said fourth signal is substantially higher than said first signal, receiving at each of a plurality of third points spaced from said second point said modulated third signal and demodulating said modulated third signal to produce said fourth signal representative of the one of said first and second signals by which said third signal was modulated, recording at each of said third points the resulting reflected seismic signals and simultaneously recording at each of said third points said fourth signal to provide a common timing signal.

10. A method in accordance with claim 9 further comprising reproducing one of the thus recorded reflected seismic signals, reproducing the corresponding thus recorded fourth signal, varying the speed at which said one of the thus recorded seismic signals is reproduced responsive to the difference between the thus reproduced fourth signal and a standard to substantially reduce any noise in the thus reproduced seismic signal due to a variation in the speed at which the corresponding reflected seismic signal was recorded.

11. A method in accordance with claim 10 further comprising subtracting from said reproduced seismic signal a signal representative of said difference.

12. A seismic exploration apparatus comprising, in combination:
 (1) a control unit comprising a first oscillator means for producing a first output signal having a first frequency and a second output signal having a second frequency, and means for selectively transmitting one of said first and second output signals from a first point;
 (2) shot point equipment comprising means for receiving the thus transmitted signal at a second point, means for generating seismic signals at said second point, and means responsive to said means for receiving to energize said means for generating seismic signals only when said thus transmitted signal has substantially the same frequency as said second output signals; and
 (3) said means to energize comprising a first flip flop circuit, means for applying said thus transmitted signal to an input of said first flip flop circuit, pulse counting means, means for applying an output of said first flip flop circuit to an input of said pulse counting means, a second flip flop circuit, a capacitor connected across the output of said pulse counting means and across an input of said second flip flop circuit to produce a voltage thereacross representative of the instantaneous average of the number of pulses counted by said pulse counting means, said second flip flop circuit being caused to change state when the input voltage thereto exceeds a predetermined value, and means for actuating said means for generating seismic signals responsive to an output of said second flip flop circuit.

References Cited by the Examiner

UNITED STATES PATENTS

| 3,086,465 | 4/1963 | De Montfort | 102—22 |
| 3,110,878 | 11/1963 | Horeth et al. | 340—15.5 |
| 3,213,413 | 10/1965 | Wall | 181—.5 |

FOREIGN PATENTS 1,274,919  9/1961  France.

BENJAMIN A. BORCHELT, *Primary Examiner.*

R. M. SKOLNIK, *Assistant Examiner.*